US009670983B2

(12) United States Patent
Martinez et al.

(10) Patent No.: US 9,670,983 B2
(45) Date of Patent: Jun. 6, 2017

(54) ISOLATORS INCLUDING DAMPER ASSEMBLIES HAVING VARIABLE ANNULI AND SPACECRAFT ISOLATION SYSTEMS EMPLOYING THE SAME

(71) Applicant: HONEYWELL INTERNATIONAL INC., Morristown, NJ (US)

(72) Inventors: Daniel Martinez, Guaynabo, PR (US); Jose Pagan, Luquillo, PR (US); Ryan Goold, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1007 days.

(21) Appl. No.: 13/864,952

(22) Filed: Apr. 17, 2013

(65) Prior Publication Data

US 2014/0312198 A1 Oct. 23, 2014

(51) Int. Cl.
*F16F 15/02* (2006.01)
*F16F 9/48* (2006.01)
(Continued)

(52) U.S. Cl.
CPC .............. *F16F 15/022* (2013.01); *B64G 1/22* (2013.01); *F16F 9/3235* (2013.01); *F16F 9/483* (2013.01);
(Continued)

(58) Field of Classification Search
CPC ........ F16F 15/02; F16F 15/022; F16F 15/023; F16F 13/00; F16F 13/002; F16F 13/007;
(Continued)

(56) References Cited

U.S. PATENT DOCUMENTS 5,074,389 A * 12/1991 Slocum ..................... F16F 5/00
188/277
5,971,117 A * 10/1999 Grundei .................. F16F 9/346
188/284
(Continued)

FOREIGN PATENT DOCUMENTS

DE 000019959106 A1 9/2000
DE 102005027597 A1 12/2006
(Continued)

OTHER PUBLICATIONS

EP Examination Report for Application No. EP 14163473.3 dated Oct. 27, 2014.
(Continued)

*Primary Examiner* — Anna Momper
(74) *Attorney, Agent, or Firm* — Lorenz & Kopf, LLP

(57) ABSTRACT

Embodiments of an isolator are provided, as are embodiments of a spacecraft isolation system employing a number of three parameter isolators. In one embodiment, the isolator includes a damper assembly and a thermal compensator external to the damper assembly. The damper assembly includes, in turn, a damper housing and a first hydraulic chamber, which is located within the damper housing and which is configured to contain a damping fluid. The thermal compensator includes a thermal compensator chamber, which is fluidly coupled to the first hydraulic chamber and which is configured to exchange damping fluid therewith during operation of the isolator. A thermal compensator bellows bounds an inner circumference of the thermal compensator chamber such that the bellows is externally pressurized when the first hydraulic chamber and the thermal compensator chamber are filled with the damping fluid.

8 Claims, 5 Drawing Sheets

(51) Int. Cl.
*B64G 1/22* (2006.01)
*F16F 9/32* (2006.01)
*F16F 13/00* (2006.01)

(52) U.S. Cl.
CPC ...... *B64G 2001/228* (2013.01); *F16F 13/007* (2013.01)

(58) Field of Classification Search
CPC .......... F16F 7/10; F16F 7/1028; F16F 7/1034; F16F 9/483; B64G 2001/228; B64G 1/22
See application file for complete search history.

(56) References Cited

U.S. PATENT DOCUMENTS

| | | | |
|---|---|---|---|
| 6,296,091 B1 | 10/2001 | Hamilton | |
| 2003/0006539 A1* | 1/2003 | Bertram | F16F 9/0209 267/120 |
| 2010/0320358 A1* | 12/2010 | Boyd | F16F 9/16 248/636 |
| 2012/0121413 A1 | 5/2012 | Rodriguez Tsouroukdissian | |

FOREIGN PATENT DOCUMENTS

| | | | | |
|---|---|---|---|---|
| EP | 0623764 A1 | 11/1994 | | |
| FR | 399700 A | 7/1909 | | |
| JP | EP 0852303 A1 * | 7/1998 | ............ | F16F 9/0209 |
| RU | WO 2012116706 A1 * | 9/2012 | ............ | F16F 9/3221 |

OTHER PUBLICATIONS

EP Search Report for Application No. 14163473.3 dated Oct. 10, 2014.
Ibrahim, R.A.; Recent Advances in Nonlinear Passive Vibration Isolators, ScienceDirect.com—Journal of Sound and Vibration; http://www.sciencedirect.com/science/article/pii/S0022460X08000436, Feb. 13, 2011.
Mateescu, D., et al.; Unsteady Potential Flow in an Axially Variable Annulus and its Effect on the Dynamics of the Oscillating Rigid Center-Body; Scopus preview—Scopus—Document details; http://www.scopus.com/record/display.url?eid=2-s2.0-0022128909&origin=inward&txGid, Feb. 13, 2013.
Mateescu, D., et al; Unsteady Viscous Effects on the Annular-Flo-Induced Instabilities of a Rigid Cylindrical Body in a Narrow Duct, Journal of Fluids and Structures (1987) 1, 197-215; 1987 Academic Press Inc. (London) Limited.
EP Examination Report for EP 14163473.3-1755 dated Oct. 19, 2015.

\* cited by examiner

ISOLATORS INCLUDING DAMPER ASSEMBLIES HAVING VARIABLE ANNULI AND SPACECRAFT ISOLATION SYSTEMS EMPLOYING THE SAME

TECHNICAL FIELD

The present invention relates generally to spacecraft isolation systems and, more particularly, to embodiments of an isolator, such as a three parameter isolator, having a damper assembly in which the flow area across an annulus varies as a function of piston stroke.

BACKGROUND

Control moment gyroscope arrays, reaction wheel arrays, and other such devices deployed onboard a satellite or other spacecraft for attitude adjustment purposes generate vibratory forces during operation. Vibration isolation systems are commonly employed to minimize the transmission of vibratory forces emitted from such attitude adjustment devices, through the spacecraft body, to any vibration-sensitive components (e.g., optical payloads) carried by the spacecraft. Vibration isolation systems commonly include a number of individual vibration isolators (typically three to eight isolators), which are positioned between the spacecraft payload and the spacecraft body in a multi-point mounting arrangement. The performance of a vibration isolation systems is largely determined by the number of isolators included within the system, the manner in which the isolators are arranged, and the vibration attenuation characteristics of each individual isolator. Vibration isolation system employing three parameter isolators, which behave mechanically as a primary spring in parallel with a series-coupled secondary spring and damper, provide superior attenuation of high frequency vibratory forces as compared to vibration isolation systems employing other types of passive isolators, such as viscoelastic isolators. The three parameter isolators are advantageously implemented as single degree of freedom ("DOF") devices, which provide damping along a single longitudinal axis. An example of a single DOF, three parameter isolator is the D-STRUT® isolator developed and commercially marketed by Honeywell, Inc., currently headquartered in Morristown, N.J.

During spacecraft launch, exceptionally high impact loads can be transmitted to the isolators of the vibration isolation system. To protect the isolators from the high impact loads generated during spacecraft launch, spacecraft isolation systems are commonly equipped with a number of launch locks, which are positioned between the spacecraft and the payload support structure (e.g., a palette or bench) in parallel with the isolators. However, while generally effective at protecting the isolation from high impact loads during launch, the usage of launch locks is associated with a number of disadvantages. The usage of multiple launch locks adds additional part count, weight, and hardware cost to the spacecraft isolation system. Initial set-up and fine tuning of launch locks can be labor intensive resulting in higher labor costs and extended manufacturing schedules. As a still further drawback, launch locks are typically actuated utilizing pyrotechnic devices, which can be unreliable and which tend to produce undesirably high shock forces when detonated potentially disrupting the payload or spacecraft components. Finally, as launch locks shunt vibrational forces around the isolators directly between the spacecraft and payload, the usage of launch lock systems results in limited isolation of the payload during spacecraft launch.

It is thus desirable to provide embodiments of an isolator, such as a three parameter isolator, that can be tuned to provide optimal damping in disparate operational environments characterized by different loading conditions. Advantageously, such a dual mode isolator could be combined with a number of like isolators to produce a multi-point spacecraft isolation system capable of remaining active during both spacecraft launch and during on-orbit operation of the spacecraft. Embodiments of such a spacecraft isolation system could thus be implemented without launch locks and thereby overcome the above-listed limitations associated therewith. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of an isolator are provided including a main spring, a secondary spring coupled in parallel with the main spring, and a damper assembly coupled in parallel with the main spring and in series with the secondary spring. The damper assembly may include a damper housing containing opposing hydraulic chambers configured to be filled with a damping fluid. A damper piston is movably mounted within the damper housing for translational movement along a working axis. The damper piston is exposed to the damping fluid in the opposing hydraulic chambers when the opposing hydraulic chambers are filled therewith. A variable annulus fluidly couples the opposing hydraulic chambers and has a cross-sectional flow area that varies as a function of damper piston stroke.

Further provided are embodiments of a spacecraft isolation system for minimizing the transmission of vibrations between a spacecraft and a spacecraft payload. The spacecraft isolation system includes a plurality of three parameter isolators ands mounting hardware, which is coupled to the plurality of three parameter isolators and configured to mount the plurality of three parameter isolators to the spacecraft. Each of the three parameter isolators include a main spring, a secondary spring coupled in parallel with the main spring, and a damper assembly coupled in parallel with the main spring and in series with the secondary spring. The damper assembly may include a damper housing containing opposing hydraulic chambers configured to be filled with a damping fluid. A damper piston is movably mounted within the damper housing for translational movement along a working axis. The damper piston is exposed to the damping fluid in the opposing hydraulic chambers when the opposing hydraulic chambers are filled therewith. A variable annulus fluidly couples the opposing hydraulic chambers and has a cross-sectional flow area that varies as a function of damper piston stroke.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
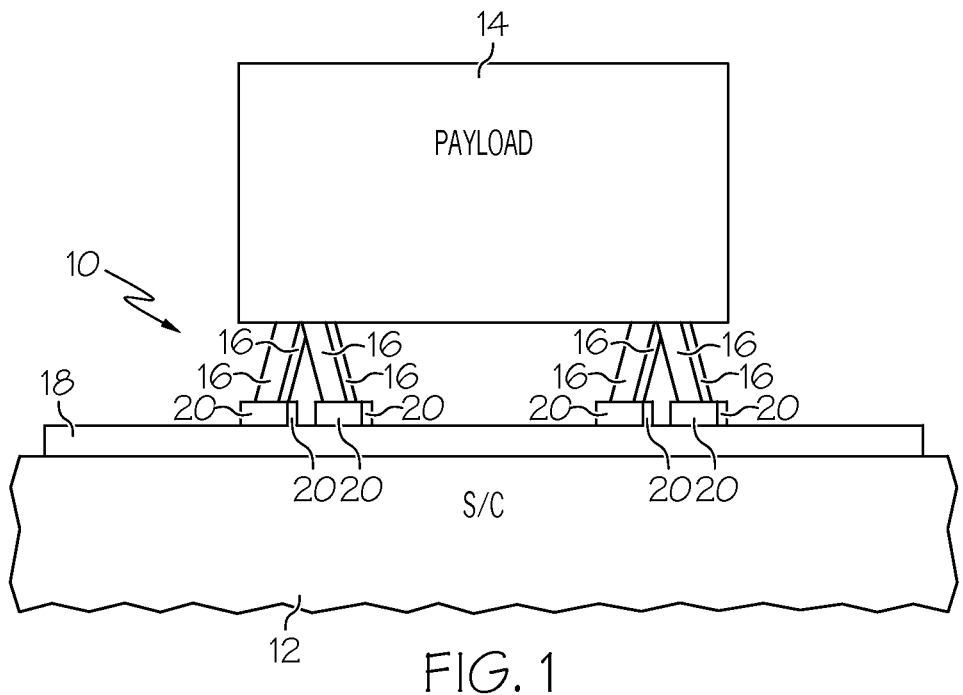
FIG. 1 is simplified schematic of a spacecraft isolation system employing eight isolators suitable for attenuating the transmission of vibrations between a spacecraft and a payload in six degrees of freedom in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. While primarily described below in the context of a single degree-of-freedom (axially-damping), three parameter isolator deployed within a multi-point spacecraft isolation system, it is emphasized that embodiments the damper assembly including a variable annulus can be integrated into other types of isolators, such as three parameter isolators providing isolation in multiple degrees-of-freedom and two parameter isolators. Furthermore, embodiments of the below-described isolator can be employed in multi-point isolation systems other than spacecraft isolation systems, such as terrestrial, waterborne, and airborne isolation systems.

Three parameter isolators commonly include a damper assembly having a housing assembly containing opposing hydraulic chambers, which are fluidly coupled by an annulus. A piston is movably disposed within the housing and has opposing faces exposed to the damping fluid contained within the hydraulic chambers. As the damper piston translates with respect to the damper housing, damping fluid is forced through the annulus and between opposing hydraulic chambers to dissipate kinetic energy by viscous losses. The geometry of the annulus has traditionally been constant or fixed; that is, the gap width between the structural elements defining the annulus remains constant over the piston's range of motion. The damping coefficient ($C_A$) of the damper assembly is consequently also fixed and, therefore, independent of the load applied to the damper piston and the resulting displacement thereof. In the case of conventional spacecraft isolation systems including launch locks that effectively render the isolators inoperative or non-active during spacecraft launch, such a fixed damping coefficient may be generally acceptable as the isolator need only operate in a single environment. In such cases, the isolators typically need only attenuate high frequency, low amplitude jitter of the type encountered during on-orbit operation and can thus be tuned to have a fixed $C_A$ optimized for such an environment. However, in instances wherein the isolator is required to operate in two or more disparate environments, such a fixed damping coefficient prevents the isolator from being optimized to provide peak damping in both environments. As a result, conventional isolators have fixing annuli are less than ideal for employment in isolation systems designed to operate in disparate environments, such a spacecraft isolation system intended to operate during spacecraft launch and during on-orbit deployment in space.

The following describes exemplary embodiments of an isolator, such as a three parameter isolator, having damper assembly in which the flow area across an annulus varies as a function of piston stroke. As a result of such a configuration, the geometry of the annulus can be tuned to provide a $C_A$ that varies in relation to piston stroke. In preferred embodiments, the cross-sectional geometry of the annulus is such that $C_A$ decreases with displacement of the damper piston away from the design or free length position in which the piston normally resides. Stated differently, the geometry of annulus is preferably such that the damper assembly of the isolator is characterized by a first predetermined $C_{A1}$ for piston displacements below a first threshold value and by a second predetermined $C_{A2}$ for piston displacement exceeding the first threshold value, wherein $C_{A1}$ exceeds $C_{A2}$. In this manner, the damper assembly may provide a relatively high damping coefficient ($C_{A1}$) under low impact/small piston displacement operating conditions of the type encountered during on-orbit operation of isolator when attenuation of low amplitude, high frequency jitter is of primary concern; while also providing a relatively low damping coefficient ($C_{A2}$) under high impact/large piston displacement operating conditions of the type encountered during spacecraft launch. An example of such a dual mode isolator is described below in conjunction with FIGS. 4-6. First, however, an overarching description of a spacecraft isolation system in provided below in conjunction with FIG. 1, and a general description of three parameter isolators that may be included in the spacecraft isolation system is provided below in conjunction with FIGS. 2 and 3.

FIG. 1 is simplified schematic of a spacecraft isolation system 10 illustrated in accordance with an exemplary embodiment of the present invention and well-suited for reducing the transmission of vibrations from a spacecraft 12, such as a satellite, to a payload 14 carried by spacecraft 12. Isolation system 10 includes a plurality of isolation devices or isolators 16, which are mechanically coupled to and collectively support payload 14. In preferred embodiments, isolators 16 serve to reduce vibration and impact forces transmitted between spacecraft 12 and payload 14 both during on-orbit operation of spacecraft 12 and during launch of spacecraft 12. For this reason, isolators 16 may be referred to as "dual mode isolators 16" hereafter. The opposing ends of dual mode isolators 16 are mounted to a spacecraft mounting interface 18 utilizing a plurality of mounting brackets 20. Dual mode isolators 16 are advantageously implemented as single degree-of-freedom dampers, which each provide damping in an axial direction. Isolators 16 are positioned in a multi-point mounting arrangement. In this particular example, isolation system 10 includes eight isolators 16, which are positioned in an octopod mounting arrangement to provide high fidelity damping in six degrees of freedom ("6-DOF"). In further embodiments, isolation system 10 may include a lesser number or a greater number of isolation devices, which may be positioned in other mounting arrangements. For example, in an alternative embodiment, isolation system 10 may include six isolators 16 positioned in a hexapod or Stewart platform-type mounting arrangement.

In certain embodiments, payload 14 may assume the form of a vibration-sensitive component, such as an optical payload or sensor suite; and isolation system 10 may serve to minimize the transmission of vibrations from a vibration-emitting source aboard spacecraft 12, through spacecraft mounting interface 18, and to payload 14. Similarly, as noted above, isolation system 10 may serve to minimize the transmission of impact forces through spacecraft mounting interface 18 and to payload 14 during spacecraft launch. In other embodiments, payload 14 may include one or more vibration-emitting devices, and isolation system 10 may serve to reduce the transmission of vibrations from payload 14 to spacecraft 12 and any vibration-sensitive components deployed thereon. In this latter regard, payload 14 may include one or more rotational devices utilized in the attitude adjustment of spacecraft 12, such as one or more reaction wheels or control moment gyroscopes.

Figure 2:
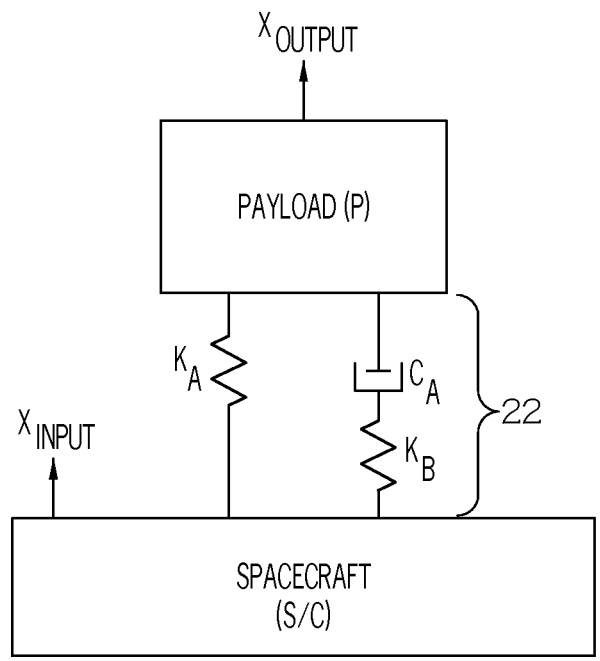
FIG. 2 is a schematic of an exemplary three parameter vibration isolator illustrated in accordance with the teachings of prior art.

FIG. 2 is a schematic representation of an exemplary three parameter isolator 22 mechanically coupled between a payload "P" and a spacecraft "S/C" and illustrated in accordance with the teachings of prior art. As modeled in FIG. 2, three parameter isolator 22 includes the following mechanical elements or components: (i) a first spring component $K_A$, which is mechanically coupled between payload P and a host spacecraft S/C; (ii) a second spring component $K_B$, which is mechanically coupled between payload P and spacecraft S/C in parallel with first spring component $K_A$; and (iii) a damper $C_A$, which is mechanically coupled between payload P and spacecraft S/C in parallel with the first spring component $K_A$ and in series with the second spring component $K_B$. Transmissibility of three parameter isolator 22 is expressed by the following equation:

$$T(\omega) = \frac{X_{output}(\omega)}{X_{input}(\omega)} \qquad \text{EQ. 1}$$

wherein $T(\omega)$ is transmissibility, $X_{output}(\omega)$ is the output motion of payload P, and $X_{input}(\omega)$ is the input motion imparted to isolator 22 by spacecraft S/C.

Figure 3:
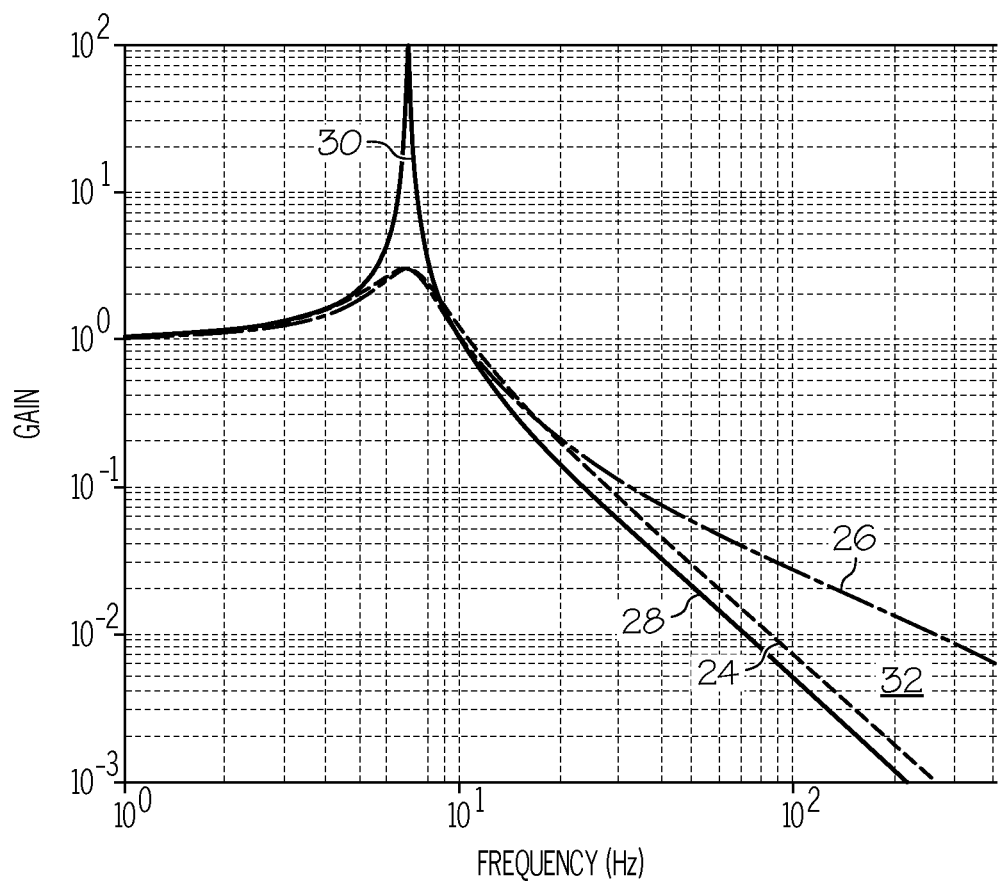
FIG. 3 is a transmissibility plot of frequency (horizontal axis) versus gain (vertical axis) illustrating the transmissibility profile of the three parameter isolator shown in FIG. 2 as compared to the transmissibility profiles of a two parameter isolator and an undamped device.

FIG. 3 is a transmissibility plot illustrating the damping characteristics of three parameter isolator 22 (curve 24) as compared to a two parameter isolator (curve 26) and an undamped device (curve 28). As indicated in FIG. 3 at 30, the undamped device (curve 28) provides an undesirably high peak gain at a threshold frequency, which, in the illustrated example, is moderately less than 10 hertz. By comparison, the two parameter device (curve 26) provides a significantly lower peak gain at the peak frequency, but an undesirably gradual decrease in gain with increasing frequency after the threshold frequency has been surpassed (referred to as "roll-off"). In the illustrated example, the roll-off of the two parameter device (curve 26) is approximately 20 decibel per decade ("dB/decade"). Lastly, the three parameter device (curve 24) provides a low peak gain substantially equivalent to that achieved by the two parameter device (curve 26), as indicated in FIG. 3 by horizontal line 34, and further provides a relatively steep roll-off of about 40 dB/decade. The three parameter device (curve 24) thus provides a significantly lower transmissibility at higher frequencies, as quantified in FIG. 3 by the area 32 bound by curves 24 and 26. By way of non-limiting example, further discussion of three parameter isolators can be found in U.S. Pat. No. 5,332,070, entitled "THREE PARAMETER VISCOUS DAMPER AND ISOLATOR," issued Jan. 26, 1984; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application.

Figure 4:
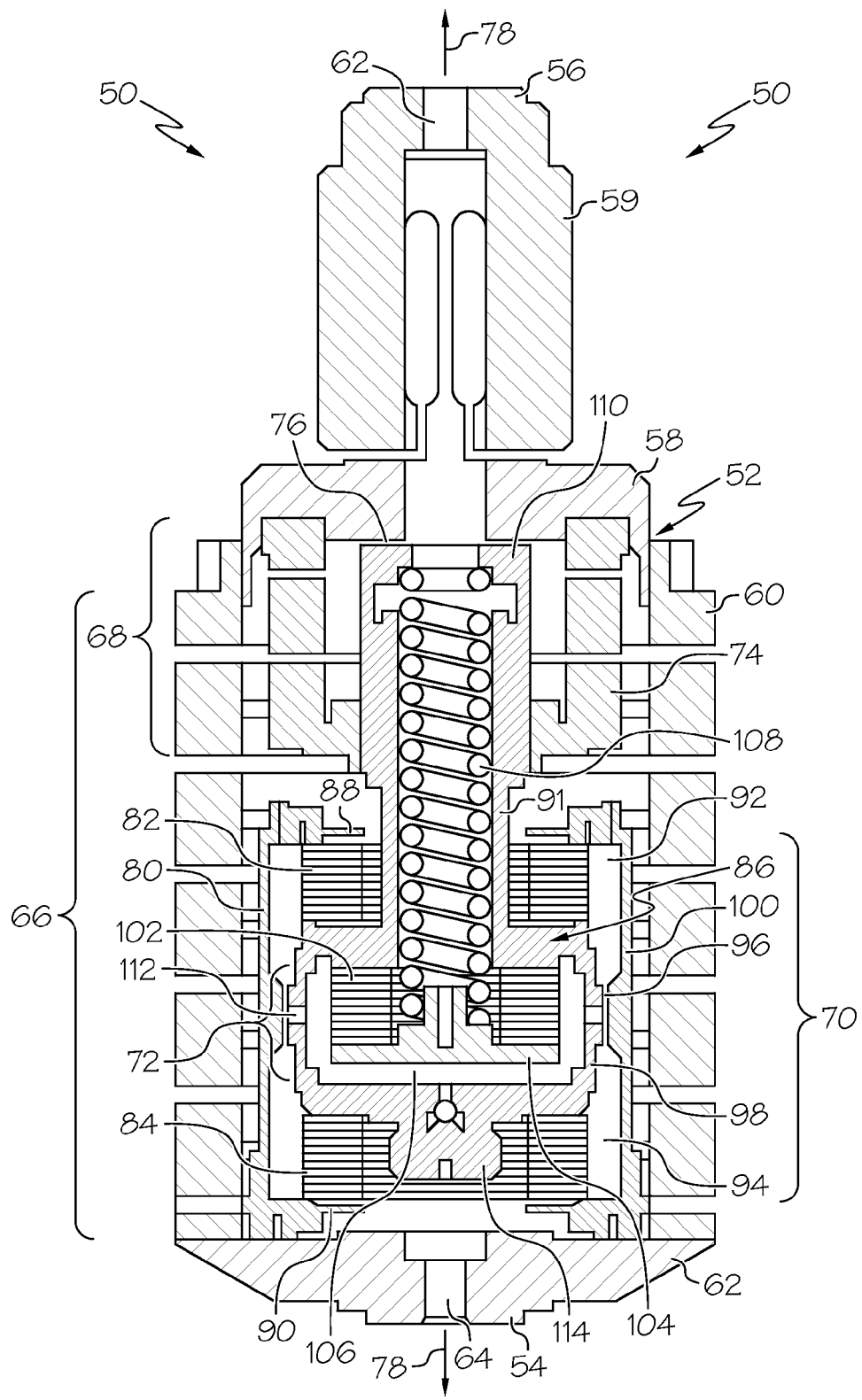
FIG. 4 is a cross-sectional view of an exemplary three parameter isolator suitable for usage as one or all of the isolation devices shown in FIG. 1 and including a damper assembly in which the flow area across an annulus varies as a function of piston stroke.

FIG. 4 is a cross-sectional view of an exemplary embodiment of a dual mode, three parameter isolator 50 suitable for usage as one or all of dual mode isolators 16 shown in FIG. 1. Exemplary dual mode isolator 50 includes a main isolator housing 52, which assumes the form of an axially elongated, tubular structure having a first end portion 54 (referred to herein as "base end portion 54") and an opposing end portion 56 (referred to herein as "upper terminal end 56"). Terms such as "upper," "lower," "base," and the like are utilized herein to provide a convenient frame of reference with respect to the illustrated orientation of isolator 16, as shown in FIG. 4. It will be appreciated, however, that the illustrated orientation is largely arbitrary and that isolator 50 may assume any orientation in three dimensional space. When isolator 50 is deployed within a spacecraft isolating system, base end portion 54 can be mounted directly or indirectly to the host spacecraft (e.g., utilizing a mounting bracket 20, as shown in FIG. 1), while upper terminal end 56 of isolator 50 is attached directly or indirectly to the spacecraft payload (e.g., upper terminal end 56 may be bolted to or otherwise attached to a bench or palette supporting the spacecraft payload). Alternatively, the orientation of isolator 16 may be inverted such that upper terminal end 56 is mounted directly or indirectly to the host spacecraft, while base end portion 54 is secured to the spacecraft payload.

Isolator housing 52 can be assembled from any number of discrete components or pieces. In the illustrated example, isolator housing 52 includes upper and lower end pieces 58 and 62, which are affixed to opposing ends of an axially-elongated, tubular intermediate piece 60. The uppermost portion of upper end piece 58 may include an axial extension 59 having a number of cutouts therein to allow extension 59 to serve as a flexure accommodating minor misalignments in mounting. End pieces 58 and 62 may be joined to intermediate piece 60 utilizing a joinder technique, such as welding or bonding; utilizing non-illustrated mechanical fasteners, such as a number of bolts; or utilizing any other suitable joinder technique or means. If desired, one or more fastener openings 62 may be provided through upper end piece 58 and/or lower end piece 62 to facilitate mounting of isolator 50 between the spacecraft and the spacecraft payload utilizing one or more additional fasteners (not shown). A central opening 64 may also be provided through lower end piece 62 to allow access to a fill port 114 included within the below-described damper assembly 70.

Three parameter isolator 50 includes four active components or devices: (i) a primary or main spring 66, (ii) a secondary spring 68, (iii) a damper assembly 70, and (iv) a thermal compensator 72. As shown in FIG. 4, main spring 66 may be integrally formed in the annular body of tubular housing piece 60 by machining. For example, main spring 66 may assume the form of a section of tubular housing piece 60 from which material has been removed utilizing laser cutting or a similar process to form a compressible spring-like structure. In other embodiments, main spring 66 may be a discrete or independent element (e.g., a coil spring) mechanically coupled to isolator housing 52. Secondary spring 68 is also preferably implemented as a machined spring, which is formed in the outer annular wall of an annular connector piece 74 contained within main isolator housing 52. The upper circumference edge of connector piece 74 abuts the interior of upper end piece 58 and may be affixed thereto utilizing, for example, a plurality of fasteners (not shown). The opposing, lower end portion of connector piece 74 is joined to the outer circumferential surface of an axially-elongated piston shaft 91 fixedly coupled to a damper piston 86 included within damper assembly 70.

Exemplary vibration isolator 50 is a three parameter device, which provides the desirable vibration attenuation characteristics described above, namely, a relatively low peak transmissibility and superior attenuation of high frequency vibrations. In keeping with the terminology introduced above in conjunction with FIGS. 2 and 3, $K_A$ is the axial stiffness of dual mode isolator 50, as a whole, which is predominately determined by the axial stiffness of primary spring 66; $K_B$ is the volumetric stiffness of isolator 50, which is predominately determined by the axial stiffness of secondary spring 68; and $C_A$ is determined by the damping characteristics of damper assembly 70. In contrast to conventional three parameter isolators, $C_A$ varies over the stroke range of the damper assembly piston included within isolator 50, as described below. In the exemplary embodiment shown in FIG. 4, primary spring 66 ($K_A$) is coupled in parallel with secondary spring 68 ($K_B$) and damper assembly 70 ($C_A$), which are coupled in series, as taken along a load transfer path extending through isolator 50. The instant example notwithstanding, vibration isolator 50 need not be a three parameter isolator in all embodiments and, in certain embodiments, may instead assume the form of a single degree of freedom, axially-damping, two parameter isolator including a primary spring (e.g., spring 66) in parallel with the damper (e.g., damper assembly 70), but lacking a secondary spring (e.g., spring 68) in parallel with the primary spring and in series with the damper.

Damper assembly 70 includes a damper housing 80 having a generally cylindrical inner cavity, which contains a first bellows 82, a second bellows 84, and a damper piston 86. Bellows 82 and 84 are sealingly joined to opposing faces of damper piston 86 to resiliently suspend damper piston 86 within damper housing 80. More specifically, the lower circumferential edge of upper bellows 82 may be sealingly joined to the upper face of damper piston 86, while the upper circumferential edge of lower bellows 84 may be sealingly joined to the opposing, lower face of damper piston 86. To fully enclose upper bellows 82 within damper housing 80, the upper circumferential edge of upper bellows 82 may be sealingly joined to an upper bellows cup 88, which is, in turn, sealingly affixed over the upper end portion of damper housing 80. Finally, the lower circumferential edge of lower bellows 84 may be sealingly joined to a lower bellows cup 90, which seats on and is sealingly joined to a lower endwall of damper housing 80. The above-listed components can be joined utilizing any coupling technique suitable for forming fluid-tight or hermetic seals. A circumferential bonding or welding technique is preferably employed, however, in embodiments wherein bellows 82 and 84 and the other components of damper assembly 70 are fabricated from high temperature metals or alloys.

With continued reference to the exemplary embodiment shown in FIG. 4, an elongated rod or piston shaft 91 extends axially from damper piston 86 toward upper end portion 56 of isolator 50. Piston shaft 91 is fixedly coupled to damper piston 86 and translates therewith along working axis 78 relative to isolator housing 52. In the illustrated exemplary embodiment, the upper terminal end of piston shaft 91 is joined to secondary spring 68 such that spring 68 is mechanically coupled to damper piston 86 through shaft 91. An axial gap 76 is provided between the upper terminal end of piston shaft 91 and the neighboring interior surface of upper end piece 58 to accommodate the translational movement of piston shaft 71. Piston shaft 91 may be integrally formed with damper piston 86 or, instead, fabricated as a separate piece that is subsequently fixed joined to damper piston 86. Similarly, damper piston 86 may be formed as a single or unitary piece or, instead, assembled from a number of separately-fabricated pieces or components.

Depending upon the particular design of isolator 50, bellows 82 and 84 can be either internally or externally pressurized. In the illustrated exemplary embodiment, bellows 82 and 84 are externally pressurized; that is, damping fluid acts on the external surfaces of bellows 82 and 84 during operation of dual mode isolator 50. When isolator 50 is fully assembled, bellows 82 and 84 cooperate with damper piston 86, upper end piece 58, and the interior surfaces of damper housing 80 to define two hermetically-sealed hydraulic chambers 92 and 94 within damper housing 80. Hydraulic chambers 92 and 94 are fluidly coupled by an intermediate variable annulus 96, which is bound along its inner circumference by an outer annular sidewall 98 of damper piston 86 and bound along its outer circumference by an inner annular sidewall 100 of damper housing 80. As can be seen in FIG. 4, the circumferential clearance or annular gap between annular sidewall 98 of damper piston 86 and inner sidewall 100 of damper housing 80 defining annulus 96 varies, when moving axially along working axis 78. Annulus 96 is thus imparted with a varying cross-sectional geometry such that the flow area across the most restricted point of annulus 96 (the metering point) changes as a function of piston stroke. The damping coefficient $C_A$ of damper assembly 70 will consequently also vary as a function of piston stroke and may, for example, transition from a first value to a second value when damper piston 86 is sufficiently displaced from its normal or free length position shown in FIG. 4. This allows damper assembly 70 and, more generally, isolator 50 to be tuned to provide optimal damping under both low impact/low displacement and high impact/high displacement operating conditions, as described more fully below in conjunction with FIGS. 5 and 6.

Thermal compensator 72 can be integrated into various different regions of isolator 50. In the exemplary embodiment illustrated in FIG. 4, thermal compensator 72 is nested within damper piston 86 to reduce the overall size and weight of isolator 50. Thermal compensator 72 includes a thermal compensator ("TC") bellows 102, a TC piston 104, and a TC preload spring 108. The upper circumferential edge of TC bellows 102 is welded, bonded, or otherwise sealingly joined to TC piston 104, while the lower circumferential edge of bellows 102 is sealingly joined to TC piston 104. TC piston 104 is thus resiliently suspended within damper piston 86 and can translate along working axis 78. Collectively, the interior surfaces of damper piston 86, TC piston 104, and TC bellows 102 define a variable-volume TC chamber 106 within damper piston 86. TC preload spring 108 may be disposed within an elongated cavity provided in piston shaft 91. TC preload spring 108 is compressed between an inner lip 110 provided around the upper end of piston shaft 91 and a spring seat provided on the upper surface of TC piston 104. TC preload spring 108 thus exerts a bias force on TC piston 104 urging expansion of TC bellows 102 and movement of piston 104 downward toward damper assembly 70 in opposition to the pressurized fluid acting on the exposed surfaces of TC bellows 102.

At least one flow passage or orifice is provided through damper piston 86 to allow fluid communication between TC chamber 106 and hydraulic chambers 92 and 94 within damper assembly 70. For example, as shown in FIG. 4, a number of cross-bores 112 may be formed through outer annular sidewall 98 of damper piston 86 to fluidly couple TC chamber 106 to hydraulic chambers 92 and 94 through variable annulus 96. Thermal compensator 72 accommodates such damping fluid expansion in the presence of high operating temperatures to maintain the pressure within hydraulic chambers 92 and 94 within an acceptable range and thereby minimize the likelihood of damping fluid leakage. In particular, when force exerted on the effective area of TC piston 104 and bellows 102 by the expanding damping fluid exceeds the bias force exerted on piston 104 by TC preload spring 108, TC piston 104 will move away from damper assembly 70 along axis 78 and TC bellows 102 will compress. The volume of TC chamber 106 will thus increase to minimize the increase in damping fluid pressure within hydraulic chambers 92 and 94 of damper assembly 70 and thereby maintain the damping fluid pressure within a desired range. Conversely, when the damping fluid decreases in volume and the pressure exerted on TC bellows 102 drops, TC bellows 102 will expand to reduce the volume within TC chamber 106 forcing damping fluid flow through flow passages 112 and into hydraulic chambers 92 and 94 and preventing the fluid pressure within damper assembly 70 from becoming undesirably low.

Outer annular sidewall 98 of damper piston 86 projects radially beyond opposing bellows 82 and 84 into an area between hydraulic chambers 92 and 94. The exposed annular area of damper piston 86 thus acts on the fluid within hydraulic chambers 92 and 94 as piston 86 translates with respect to damper housing 80 along the longitudinal or working axis 78 of isolator 50. As damper piston 86 translates with respect to damper housing 80, damping fluid is forced through annulus 96 and between opposing hydraulic chambers 92 and 94 to dissipate kinetic energy, largely by viscous losses, and thereby provide the provide the desired damping effect. Prior to operation of isolator 50, opposing hydraulic chambers 92 and 94 are filled with a damping fluid (not shown), such as a silicone-based liquid. A fill port 114 may be provided through damper housing 80 to enable hydraulic chambers 92 and 94 to be filled with the selected damping fluid after assembly of isolator 50. After filling of hydraulic chambers 92 and 94, fill port 114 may be permanently sealed by, for example, deformation of a sealing element (e.g., a copper ball) positioned within the fill port flow passage.

Figure 5:
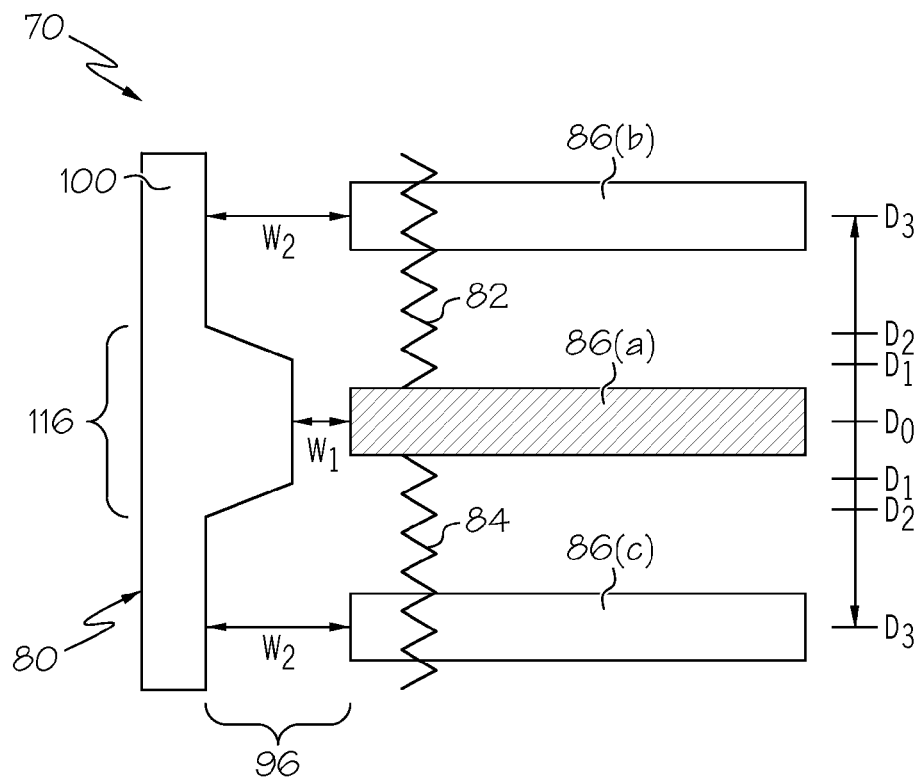
FIG. 5 is a schematic representative of the damper assembly of the exemplary three parameter isolator shown in FIG. 4 illustrating the manner in which the flow areas across the annulus may increase with greater piston displacement away from an intermediate design or free length position, in an embodiment.

As previously noted, annulus 96 of damper assembly 70 is imparted with a varying cross-sectional geometry such that the flow area across annulus 96 changes with displacement of damper piston 86. The annulus geometry can be tailored to provide a $C_A$ that varies as a function of piston stroke and can therefore be tuned to provide optimal damping in different environments characterized by disparate loading conditions and disparate piston displacements. Further illustrating this point, FIG. 5 is a schematic representation of a portion of damper assembly 70 shown in FIG. 4. The following components of damper assembly 70 are schematically represented in FIG. 5: variable annulus 96; inner annular sidewall 100 of damper housing 80, which bounds the outer circumference of annulus 96; damper piston 86, the outer annular surface or sidewall of which bounds the inner circumferential of annulus 96; and opposing bellows 82 and 84. Damper piston 86 normally resides in a centered or intermediate position 86(a) (referred to herein as the "design" or "free length position") when isolator 50 is subject to zero or nominal disturbance forces. This position corresponds to $D_0$ (zero displacement), as identified on the right hand side of FIG. 5. When isolator 50 is subject to low to moderate impact forces, such as low amplitude jitter encountered during on-orbit operation of isolator 50, the axial displacement of piston 86 will be relatively limited and, again referring to the right hand side of FIG. 5, will generally remain below a minimum displacement threshold $D_1$. In contrast, in the presence of high impact forces of the type generated during spacecraft launch, displacement of piston 86 will exceed the intermediate displacement threshold $D_1$, while remaining below a maximum displacement threshold $D_3$. Finally, there may exist a transitional displacement range between the minimum displacement threshold ($D_1$) and the maximum displacement threshold ($D_3$), as indicated in FIG. 5 by the axial offset between $D_1$ and an intermediate position identified in FIGS. 5 and 6 as "$D_2$."

In the exemplary embodiment shown in FIG. 5, inner annular sidewall 100 of damper housing 80 is imparted with a stepped cross-sectional profile having a radially-constricted midsection 116. When damper piston 86 resides in design position 86(a), the sidewall of damper piston 86 is disposed adjacent radially-constricted midsection 116. The lateral width of the circumferential gap between damper piston 86 and the laterally-adjacent interior surface of damper housing 80 (identified in FIG. 5 as "$W_1$") will thus be relatively small. As a result, the cross-sectional flow area across annulus 96 will be relatively limited and $C_A$ will be relatively high. Conversely, damper piston 86 is axially offset or displaced from radially-constricted midsection 116 when piston 86 undergoes maximum displacement ($D_3$) and, thus, moves into either positional extreme 86(b) or positional extreme 86(c), respectively, The lateral width of the circumferential gap between damper piston 86 and damper housing 80 (identified in FIG. 5 as "$W_2$") will thus be relatively large, the cross-sectional flow area across annulus 96 will increase, and the value of $C_A$ will decrease. Stated differently, the minimum lateral distance (W) between the annular sidewall of damper piston 86 and inner annular surface 100 of damper housing 80 varies with movement of piston 86, as taken along a cut plane containing the longitudinal axis 78 of isolator 50 (shown in FIG. 4), such that $C_A$ varies as a function of piston stroke. In the illustrated example, the inner annual surface 100 of damper housing 80 has a non-linear cross-sectional profile and, specifically, a stepped cross-sectional geometry, as taken along such a cut plane. In further embodiments, inner annual surface 100 of damper housing 80 may have a different non-linear cross-sectional profile, such as a concave or convex cross-sectional profile.

Figure 6:
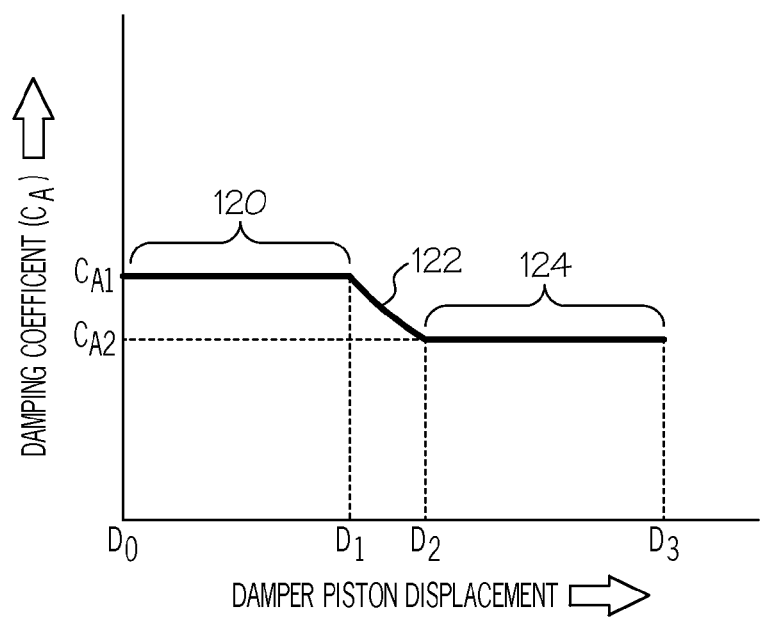
FIG. 6 is a graph of damping coefficient $C_A$ (vertical axis) versus damper piston displacement (horizontal axis) illustrating an exemplary piecewise profile of the damping assembly schematically shown in FIG. 5.
Figure 7:
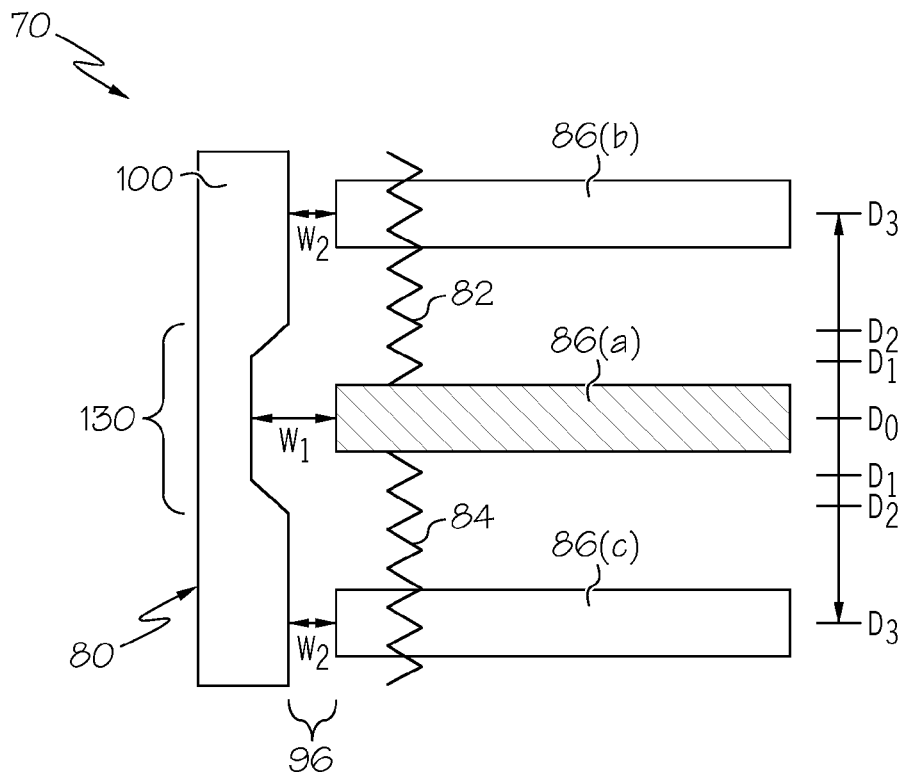
FIG. 7 is a schematic of an exemplary damper assembly wherein the flow area across an annulus decreases with greater piston displacement away from an intermediate design or free length position, as illustrated in accordance with a further exemplary embodiment.

FIG. 6 is a graph of damping coefficient $C_A$ (vertical axis) versus damper piston displacement (horizontal axis) illustrating an exemplary piecewise profile of damping assembly 70. The damping profile of damping assembly 70 is generally characterized over the predetermined axial displacement range ($D_0$ to $D_3$) by a piecewise function and, more specifically, by a three stage, piecewise function. The first stage of the piecewise function (represented in FIG. 7 by a first substantially linear segment 120) corresponds to a piston displacement of $D_0$ to $D_1$; the second stage of the piecewise function (represented by a second substantially linear segment 122) corresponds to a displacement of $D_1$ to $D_2$; and the third and final stage of the piecewise function (represented by a third substantially linear segment 124) corresponds to a displacement of $D_2$ to $D_3$. As can be seen in FIG. 6, damper assembly 70 has a first predetermined damping coefficient $C_{A1}$ over the first displacement range ($D_0$ to $D_1$) and a second predetermined damping coefficient $C_{A2}$ over the third displacement range ($D_2$ to $D_3$). As the cross-sectional flow area across annulus 96 enlarges with increasing piston displacement, $C_{A1}$ will be greater than $C_{A2}$. In the illustrated example, the geometry of inner annular sidewall 100 of damper housing 80 is such that $C_{A1}$ is held constant over displacement range $D_0$ to $D_1$ and $C_{A2}$ is likewise held constant over displacement range D2 to D3; as a corollary, segments 120 and 124 each have a substantially zero slope. In further embodiments, however, the cross-sectional geometry of annulus 96 may be such that $C_{A1}$ and/or $C_{A2}$ vary over their respective displacement ranges; thus, to encompass both scenarios, the isolator may be described as having a first average damping coefficient ($C_{A1}$) for piston displacement less than a first predetermined displacement threshold ($D_1$) and with a second average damping coefficient ($C_{A2}$) for piston displacements greater than a second predetermined threshold ($D_2$).

It should thus be appreciated that the cross-sectional geometry of variable annulus 96 can be tailored to allow damper assembly 70 to be tuned to provide a relatively high damping coefficient $C_{A1}$ optimized for damping in low impact/small piston displacement environments, such as on-orbit operation wherein attenuation of low amplitude, high frequency jitter is of primary concern; and a relatively low damping coefficient $C_{A2}$ optimized for damping in high impact/large piston displacement environments of the type that may encountered during spacecraft launch. Substantially linear intermediate segment 122 (as determined by the slanted sidewall of midsection 116 in FIG. 5) provides a gradual transition from $C_{A1}$ to $C_{A2}$ to minimize transient pressure spikes within damper assembly 70. In the illustrated example wherein $C_{A1}$ is greater than $C_{A2}$, substantially linear intermediate segment 122 has a negative slope. In other embodiments, the cross-sectional geometry of annulus 96 may be such that intermediate segment 122 is non-linear. Alternatively, the cross-sectional geometry of annulus 96 may be such that intermediate segment 122 is non-existent, in which case D1 will equal D2 and damper assembly 70 may transition directly from segment 120 (low impact/small piston displacement mode) to segment 124 (high impact/large piston displacement mode). By way of non-limiting example only, $D_1$ may have a value between about 2.5 microns and about 2500 microns; and $D_2$ may have a value within the same range providing that the value of $D_2$ is greater or equal to $D_1$. In an embodiment, $C_{A1}$ may be between about 12 pounds per inch per second ("lb/(in/s)") or about 2101 Newton per meter per second ("N/(m/s)") and about 30 lb/(in/s) or about 5254 N/(m/s), while $C_{A2}$ may be between about 3 lb/(in/s) or about 525 N/(m/s) and about 10 lb/(in/s) or about 1751 N/(m/s); however, the foregoing damping coefficients may be higher or lower in further embodiments. In one implementation, $C_{A1}$ is at least 25% greater than $C_{A2}$.

The foregoing has thus provided embodiments of an isolator in which the flow area across an annulus varies as a function of piston stroke. By design, the damping coefficient $C_A$ of the above-described isolator can be tailored to vary over the piston stroke and thereby tune the peak damping phase frequency as a function of the expected stroke range of the damper piston and the expected conditions of the environment or environments in which the isolator is intended to operate. In preferred embodiments, the isolator is implemented as a "dual mode isolator" tuned to operate in two different modes: (i) an on-orbit mode during which low impact, high frequency vibrations are transmitted through the isolator, and (ii) a launch mode during which significant impact high loads are transmitted through the isolator at lower frequencies. Advantageously, spacecraft isolation systems can be produced including a plurality of the above-described dual mode isolators and lacking launch locks, although the possibility that a spacecraft isolation system may include the above-described dual mode isolators in combination with one or more launch locks is by no means precluded.

Figure 8:
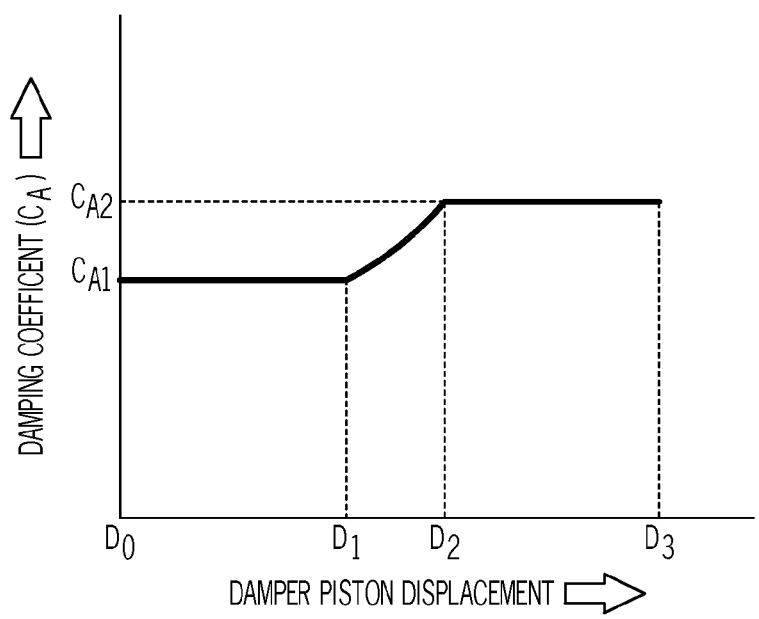
FIG. 8 is a graph of damping coefficient $C_A$ (vertical axis) versus damper piston displacement (horizontal axis) illustrating an exemplary piecewise profile of the damping assembly schematically shown in FIG. 7.

In the above-described exemplary embodiment, the annulus was imparted with a cross-sectional geometry that resulted in a decrease in $C_A$ with increasing displacement of the damper piston away from the design or free length position in which the piston normally resides. It is also possible for the variable annulus to be imparted with various other geometries tailored for different operating environments. For example, in certain embodiments, the annulus was imparted with a cross-sectional geometry that results in an increase in $C_A$ with increasing displacement of the damper piston away from the design or free length position. This may be more fully appreciated by referring to FIG. 7, which illustrates exemplary damper assembly 70 in accordance with a further exemplary embodiment wherein like reference numerals are utilized to denote like structural elements. Here, annular sidewall 100 of damper housing 80 has been imparted with a radially-expanded midsection 130 such that the lateral gap width of the annulus increases from a first predetermined value ($W_1$) to a second predetermined value ($W_2$) as damper piston 86 moves axially from its design position 86(a) to either positional extreme 86(b) or 86(c). Stated differently, annulus 96 will partially close as piston 86 is displaced from its design position 86(a). As a result, and as graphically indicated in FIG. 8, the damping coefficient of damper assembly 70 will transition from a predetermined minimum value $C_{A1}$ to a predetermined maximum value $C_{A2}$ with sufficient displacement of damper piston 86 away from the intermediate, design position in which piston 86 normally resides.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An isolator, comprising:
   a spring; and
   a damper assembly coupled in series with the spring, the damper assembly comprising:
      a damper housing containing opposing hydraulic chambers configured to be filled with a damping fluid;
      a damper piston movably mounted within the damper housing for translational movement along a working axis, the damper piston exposed to the damping fluid in the opposing hydraulic chambers when the opposing hydraulic chambers are filled therewith; and a variable annulus fluidly coupling the opposing hydraulic chambers, the variable annulus configured to cooperate with the damper piston to the impart the damper assembly with a first average damping coefficient ($C_{A1}$) for piston displacement less than a first predetermined displacement threshold ($D_1$) from a centered position of the damper piston and with a second average damping coefficient ($C_{A2}$) for piston displacements greater than a second predetermined threshold ($D_2$) from the centered position of the damper piston, wherein $C_{A1}$ exceeds $C_{A2}$ by at least 25%, and wherein $D_1$ is between 2.5 and 2500 microns.

2. The isolator of claim 1 wherein $C_{A1}$ is between about 12 and about 30 pounds per inch per second, while $C_{A2}$ is between about 3 and about 10 pounds per inch per second.

3. The isolator of claim 1 wherein the damper assembly has a damping coefficient-versus-damper displacement profile generally characterized by a piecewise profile.

4. The isolator of claim 3 wherein the damping coefficient-versus-damper displacement profile comprises:
a first substantially linear segment representative of damper piston displacement less than the first predetermined displacement threshold ($D_1$);
a second segment representative of damper piston displacement from the first predetermined displacement threshold ($D_1$) to the second predetermined threshold ($D_2$); and
a third substantially linear segment representative of damper piston displacement greater than the second predetermined threshold ($D_2$).

5. The isolator of claim 4 wherein at least one of the first substantially linear segment and the third substantially linear segment has a slope substantially equivalent to zero.

6. An isolator, comprising:
a spring; and
a damper assembly coupled in series with the spring, the damper assembly comprising:

a damper housing containing opposing hydraulic chambers configured to be filled with a damping fluid;
a damper piston movably mounted within the damper housing for translational movement through a stroke range between first and second positional extremes, the damper piston exposed to the damping fluid in the opposing hydraulic chambers when the opposing hydraulic chambers are filled therewith; and
a variable annulus fluidly coupling the opposing hydraulic chambers, the variable annulus and the damper piston combining to the impart the damper assembly with a damping coefficient-versus-damper displacement profile generally characterized by a piecewise function including a first segment corresponding to an on-orbit mode of the isolator and including a second segment corresponding to a launch mode of the isolator;
wherein the variable annulus comprises a circumferential gap, which circumscribes the damper piston throughout the stroke range thereof and which has a maximum width when the damper piston moves into either of the first and second positional extremes; and
wherein the first segment of the piecewise function corresponding to the on-orbit mode of the isolator is limited to a stroke range of the damper piston of less than 2500 microns, as taken in either direction from a centered position between the first and second positional extremes; and
wherein the first segment corresponding to the on-orbit mode has a first average damping coefficient ($C_{A1}$), wherein the second segment corresponding to the launch mode has a second average damping coefficient ($C_{A2}$), and wherein $C_{A1}$ is greater than $C_{A2}$.

7. The isolator of claim 6 wherein at least one of the first segment and the second segment has a slope substantially equivalent to zero.

8. The isolator of claim 6 wherein the piecewise function further includes a third substantially linear segment providing a transition between the first and second segments and having a negative slope.

* * * * *